US009026342B2

(12) United States Patent
Kemmer et al.

(10) Patent No.: US 9,026,342 B2
(45) Date of Patent: May 5, 2015

(54) METHOD AND DEVICE FOR OPERATING AN INTERNAL COMBUSTION ENGINE

(75) Inventors: Helerson Kemmer, Vaihingen (DE); Holger Rapp, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 518 days.

(21) Appl. No.: 13/381,303

(22) PCT Filed: Jun. 1, 2010

(86) PCT No.: PCT/EP2010/057647
§ 371 (c)(1),
(2), (4) Date: Mar. 9, 2012

(87) PCT Pub. No.: WO2011/000650
PCT Pub. Date: Jan. 6, 2011

(65) Prior Publication Data

US 2012/0166069 A1 Jun. 28, 2012

(30) Foreign Application Priority Data

Jun. 30, 2009 (DE) ........................ 10 2009 027 311

(51) Int. Cl.
*B60T 7/12* (2006.01)
*F02D 41/20* (2006.01)
*F02D 41/38* (2006.01)

(52) U.S. Cl.
CPC ................ *F02D 41/20* (2013.01); *F02D 41/38* (2013.01)

(58) Field of Classification Search
CPC ............ F02D 2041/2055; F02D 41/20; F02D 2041/2017; F02D 2041/2058; F02D 2200/063
USPC ........... 123/299, 478, 490; 701/105; 361/139, 361/143, 144, 152, 153; 251/129.08–129.1
See application file for complete search history.

(56) References Cited

U.S. PATENT DOCUMENTS

| | | | | |
|---|---|---|---|---|
| 4,856,482 | A * | 8/1989 | Linder et al. | 123/506 |
| 5,245,501 | A * | 9/1993 | Locher et al. | 361/154 |
| 5,878,722 | A * | 3/1999 | Gras et al. | 123/506 |
| 5,892,649 | A * | 4/1999 | Kahr et al. | 361/154 |
| 7,505,846 | B2 * | 3/2009 | Stoecklein et al. | 701/105 |
| 2002/0162542 | A1 | 11/2002 | Dutart et al. | |
| 2006/0082252 | A1 * | 4/2006 | Allmendinger et al. | 310/316.03 |
| 2007/0079811 | A1 * | 4/2007 | Nakane | 123/478 |
| 2008/0028843 | A1 * | 2/2008 | Dietl et al. | 73/118.1 |

(Continued)

FOREIGN PATENT DOCUMENTS

| | | |
|---|---|---|
| CN | 1150469 | 5/1997 |
| DE | 10 2008 044 144 | 6/2009 |

(Continued)

OTHER PUBLICATIONS

International Search Report for PCT/EP2010/057647, dated Aug. 19, 2010.

*Primary Examiner* — Stephen K Cronin
*Assistant Examiner* — Joseph Dallo
(74) *Attorney, Agent, or Firm* — Kenyon & Kenyon LLP

(57) ABSTRACT

In a method for operating an internal combustion engine in which fuel arrives in at least one combustion chamber via at least one injector configured as an electromagnetic actuating device, an opening delay time of the injector (18) is ascertained by varying a control duration of the injector and analyzing a characteristic curve of an electrical operating variable of the injector that characterizes a movement of a valve element of the injector.

16 Claims, 6 Drawing Sheets

(56) References Cited

U.S. PATENT DOCUMENTS

| | | | | |
|---|---|---|---|---|
| 2008/0047529 | A1* | 2/2008 | Cooke et al. | 123/478 |
| 2010/0263632 | A1* | 10/2010 | Miyake et al. | 123/476 |
| 2010/0275885 | A1* | 11/2010 | Becker et al. | 123/478 |
| 2013/0312709 | A1* | 11/2013 | Rodriguez-Amaya et al. | 123/478 |

FOREIGN PATENT DOCUMENTS

| | | |
|---|---|---|
| EP | 1 544 446 | 6/2005 |
| GB | 2277173 | 10/1994 |
| JP | 6-317230 | 11/1994 |
| JP | 2002-180934 | 6/2002 |
| JP | 2005-180338 | 7/2005 |
| JP | 2009-138639 | 6/2009 |

* cited by examiner

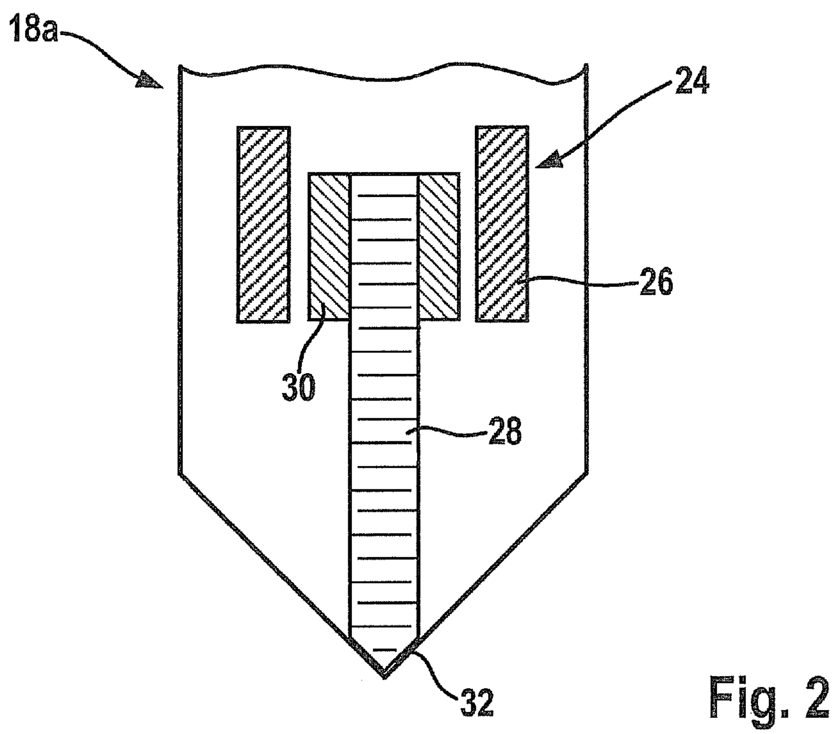
Fig. 2
Fig. 3
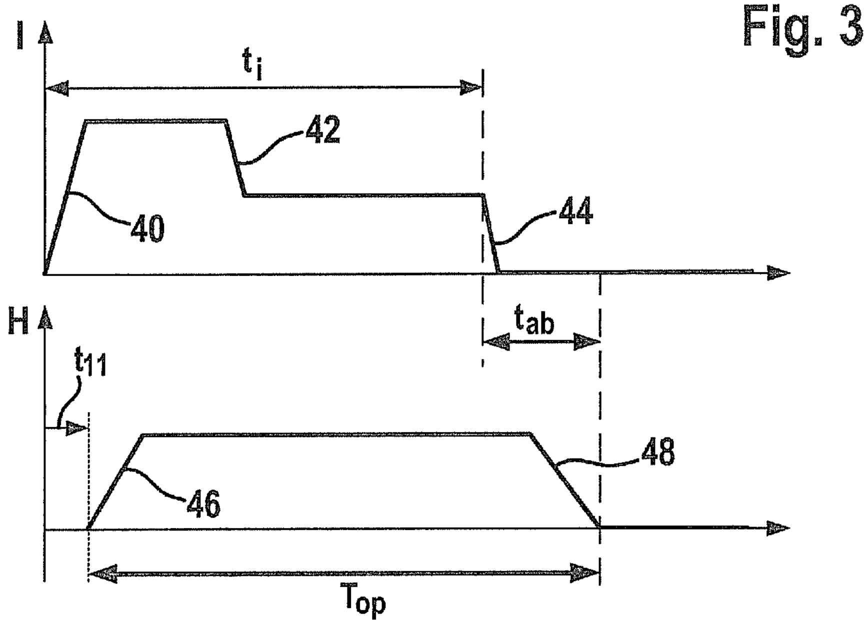

METHOD AND DEVICE FOR OPERATING AN INTERNAL COMBUSTION ENGINE

BACKGROUND OF THE INVENTION

1. Field of the Invention

The present invention relates to a method for optimizing fuel injection in operating an internal combustion engine.

2. Description of Related Art

Internal combustion engines are known commercially, for example, where gasoline is injected by injectors directly into the particular combustion chambers. Injectors of this kind come equipped with a valve needle that is actuated by an electromagnetic actuating device, for example. Various methods are known for calculating an optimal, exact quantity of injected fuel whereby, inter alia, control information for the injectors, such as start of control, control duration and/or end of control are ascertained. The more accurately this information is available, the more precisely can a metering of the control and/or regulating device be controlled; to this end, it also being necessary to consider delay times during valve needle opening and closing.

BRIEF SUMMARY OF THE INVENTION

It is, therefore, an object of the present invention to further refine a method of the type mentioned at the outset that will further optimize fuel injection via the injectors.

An opening delay time of the injector is ascertained using the method according to the present invention. Individual, mutually deviating inaccuracies in the valve elements, in a valve seat, and also potentially in a solenoid armature are taken into consideration that lead to tolerance deviations for the opening delay time. In the context of the method of the present invention, the basic design of the injectors actuated by the electromagnetic actuating device is not particularly significant, i.e., the valve elements may be both fixedly connected to the solenoid armature, or they may include a solenoid armature that has a certain axial clearance from the valve element.

A valve opening time encompasses a control duration, minus the opening delay time, and (upon completion of the control duration) a closing time. Thus, purely mathematically, it holds that:

$$\text{Valve opening time} = \text{control duration} - \text{opening delay time} + \text{closing time} \quad (1)$$

The idea underlying the present invention is to ascertain that control duration at which a lifting movement of the valve element is exactly no longer possible or is exactly not yet possible, and the valve thereby remains closed. Thus, there is no valve opening time and no closing time. Transposing the above mentioned formula for this case reduces the formula purely mathematically to:

$$\text{Opening delay time} = \text{control duration} \quad (2)$$

In this case, this means that the thus ascertained control duration corresponds to that opening delay time which, in the simplest case, may be regarded as constant independently of the actual control duration during driving operation.

The closing of the injector may be readily determined using various known methods, for example with the aid of sensors and/or by analyzing electrical or electromagnetic parameters. Some of these are already implemented in the control and regulation of the injectors. Thus, this does not constitute an additional cost factor.

The method according to the present invention is particularly effective when the control duration is successively reduced until the very moment when a closing of the injector is no longer ascertainable, or when the control duration is successively increased until the very moment when a closing of the injector is ascertainable, and in that the opening delay time for the injector is determined from the time from the start of control until the closing for the last time, respectively the closing for the first time. To reduce the determination time, a greater jump in time to near the critical point may be executed in a first step of the method, and the critical control duration may be subsequently approached in small steps in which the lifting and closing movement of the valve element is only just recognized again, respectively is only just not yet recognized. In the process, it may be taken into account that the closing may not be diagnosable in the case of a minimal opening of the valve element, with the result that the diagnosed control duration deviates from a precise value. In this case, empirically determined adaptation values, for example from a test field, may be used to correct the ascertained control duration value accordingly, for example in the control and/or regulating device. It is also conceivable to approach the critical control duration from both sides and to subsequently derive the precise, critical control time from both ascertained values in accordance with a predefined algorithm (for example, by mean value generation).

The method of the present invention provides for the electrical operating variable to be a time derivative (gradient) of a voltage of a solenoid coil of the electromagnetic actuating device, and for a closing of the injector to be inferred from a minimum of the gradient. In response to the valve element making contact in a valve seat of the injector, the decaying voltage of the electromagnetic actuating device is influenced by a change in the mutual inductance induced by the change in the valve element movement, resulting in a saddle-like voltage curve in which the point of inflection of the curve corresponds to the point of contact of the valve element. To reliably recognize the contact making of the valve element, the time derivative (gradient) of the voltage curve is advantageous since the saddle-like curve is transformed into a readily diagnosable minimum. Upon completion of the control time, merely the first occurring minimum is to be considered since further minima may be subsequently produced, for example, by bouncing of the valve element or of the armature. Alternatively or additionally, the contact making of the valve element may be recognized by a second derivative of the function which has a zero value upon closing of the valve element. The voltage curve may be readily derived in the control and/or regulating device and at a low cost.

To obtain reliable opening time-delay values at any time and to recognize a drift, respectively a wear-induced aging of the injector, the process is repeated (for example, each time following a specific operating time or a specific number of operating cycles) during operation of the internal combustion engine.

It is also advantageous that the method may be implemented during an internal combustion engine operation employing multipoint injections, the control duration then being varied merely for one single point injection and being essentially compensated in a torque-neutral and/or exhaust gas-neutral manner by variations in the control duration of at least one other single point injection. This means that the method does not interfere with the operation of the internal combustion engine.

Moreover, the method may be carried out during an overrun condition of the internal combustion engine under retarded ignition timing conditions. Here the advantage is derived, for example, that a fuel pressure may be freely varied as needed to determine the pressure dependency of the opening delay time. The duration of injection may be gradually increased from the state in which the injector is definitely not opening to the first opening thereof. Thus, any adverse effect on the exhaust gas is minimal. If a retarded ignition timing is assigned to the control, the injected fuel is essentially combusted in a torque-neutral manner. This measure as well serves to ensure that the normal operation of the internal combustion engine is not hindered by the method.

The knowledge of the exact opening delay time makes it possible to consider the same when controlling and/or regulating the injector. The fuel metering and the entire control and/or regulation of the fuel injection may be hereby further refined (in this regard, compare formula (1)). Ascertaining the opening delay time for all injectors of an internal combustion engine reduces the variance in the injection quantity from one injector to another, thereby economizing fuel and ensuring greater uniformity of the internal combustion engine operation.

It is also provided that the method be implemented for different fuel pressures and that a characteristic map be generated from the results of the method. This may used, for example, for a regulated or controlled operation of the fuel injectors.

BRIEF DESCRIPTION OF THE DRAWINGS

FIG. 2 shows a schematic representation of an injector from FIG. 1.

FIG. 3 shows two diagrams in which, on the one hand, a control current of the injector from FIG. 2 and, on the other hand, the effect thereof on a lift of the injector are plotted over time.

DETAILED DESCRIPTION OF THE INVENTION

Figure 1:
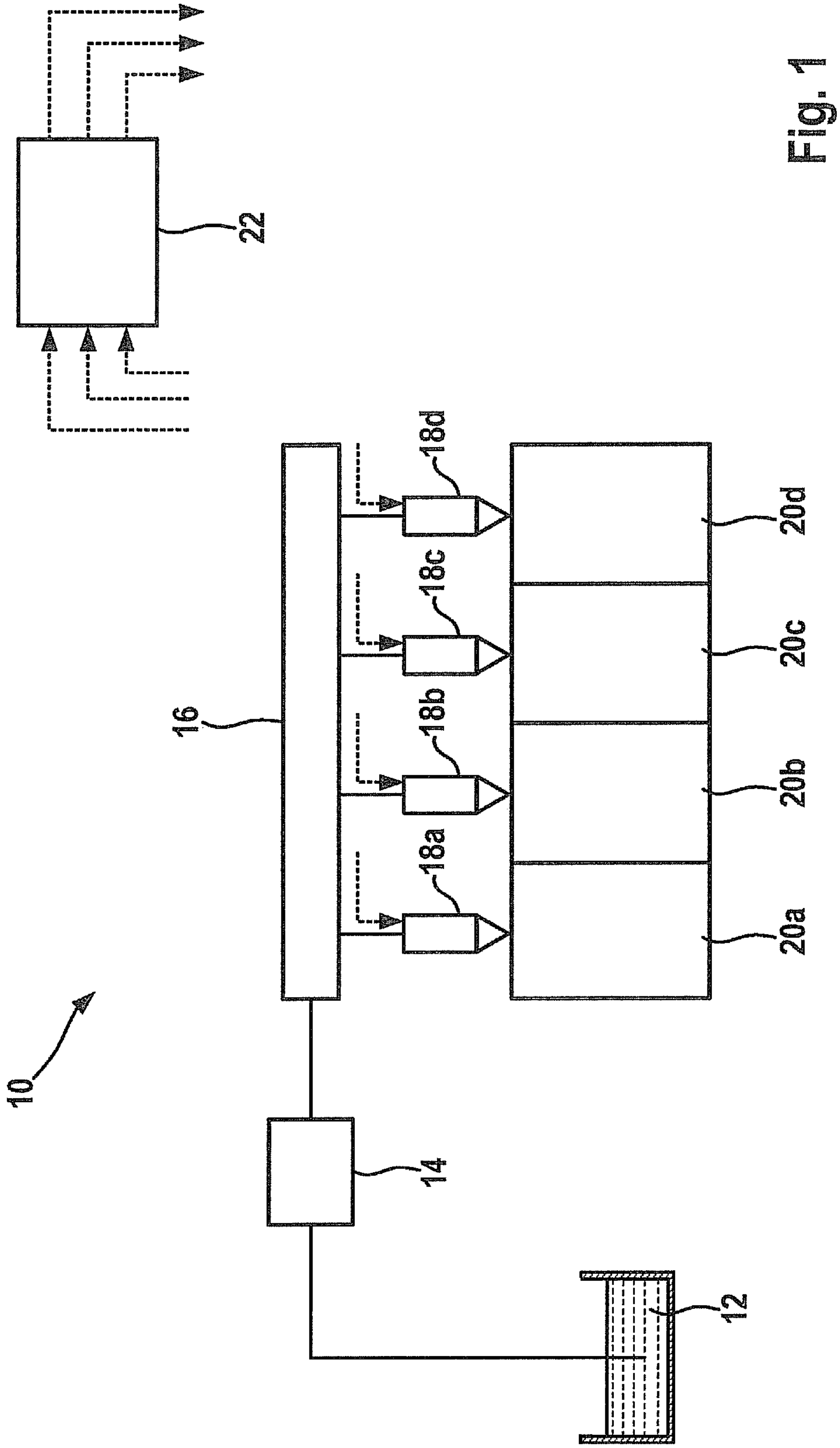
FIG. 1 shows a schematic representation of an internal combustion engine having a plurality of injectors.

In FIG. 1, an internal combustion engine is denoted as a whole by reference numeral 10. It encompasses a tank 12 from which a delivery system 14 supplies fuel to a common rail 16. Connected thereto are a plurality of injectors 18*a* through 18*d* which inject the fuel directly into combustion chambers 20*a* through 20*d* assigned thereto. The operation of internal combustion engine 10 is controlled, respectively regulated by a control and regulating device 22 which, inter alia, also controls injectors 18*a* through 18*d*.

FIG. 2 shows injector 18*a* exemplarily in greater detail. It encompasses an electromagnetic actuating device 24 which, in turn, includes an electromagnetic coil 26 and a solenoid armature 30 on a valve needle 28. In the present case, solenoid armature 30 is fixedly connected to valve needle 28. It is also possible, however, for a certain axial clearance to be provided between solenoid armature 30 and valve needle 28.

In principle, injector 18*a* functions in the following manner: Injector 18*a* is shown in FIG. 2 in a closed state, i.e., valve needle 28 rests against a valve seat 32. To actuate solenoid armature 30, a voltage ("control voltage") is applied to electromagnetic coil 26 via the control of control and regulating device 22 and an output stage (not shown) that energizes coil 26 and, given the appropriate strength and duration, lifts valve needle 28 off from valve seat 32.

FIG. 3 shows a schematic representation of such a control of injector 18*a* (as an example) and the effect on an opening time of injector 18 over time. FIG. 3 includes two diagrams, the upper diagram showing the time characteristic of a control current 1, and the lower diagram showing lift H of injector 18*a* induced by the same.

The characteristic curve of control current I in the top diagram shows an initially rapid rise (compare reference numeral 40), which is then kept constant for a certain time period, and then drops more or less by half (compare reference numeral 42). This current level is maintained until the end of control duration $t_i$. The end of control duration $t_i$ is characterized in that current I is switched off (compare reference numeral 44).

In the bottom diagram, it is discernible that valve needle 28 of injector 18*a* lifts off following the beginning of the control only after a certain opening delay time $t_1$ (compare reference numeral 46). If valve needle 28 has reached its maximum displacement, it suffices to use less control current 1 to maintain this level. If control current 1 is switched off, valve needle 28 is lowered again into valve seat 32, however, likewise after a delay (compare reference numeral 48). The time interval from the switching off of control current 1 until complete closing is defined as closing time $t_{ab}$ of valve needle 28. The entire valve opening time is characterized by $T_{op}$. Thus, purely mathematically, it holds that:

$$T_{op}=t_i-t_{11}+t_{ab}$$

Figure 4:
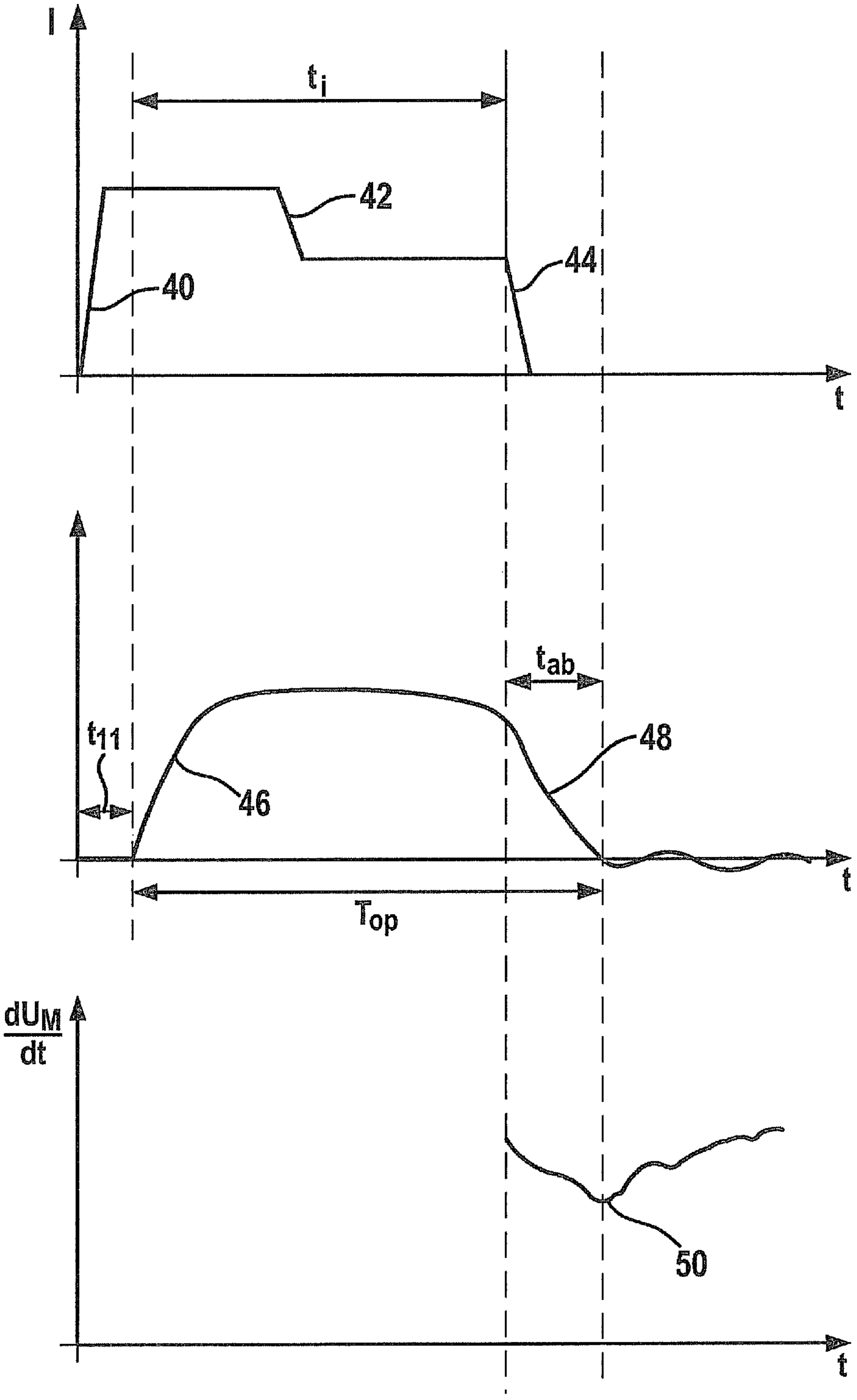
FIG. 4 shows three diagrams in which the control current, the lift and the derivative of the coil voltage are plotted over time (during a normal operation of the internal combustion engine).
Figure 5:
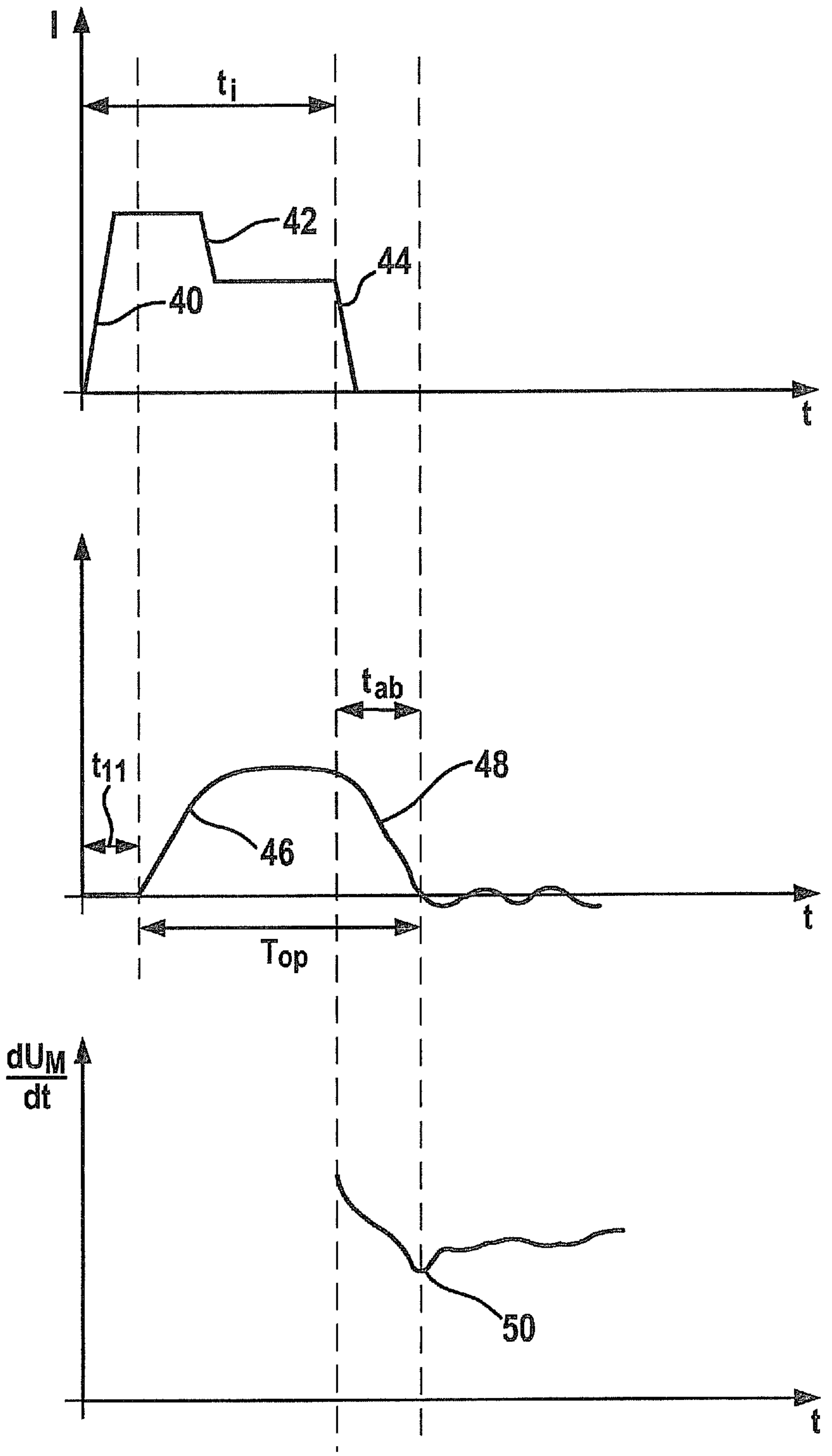
FIG. 5 shows three diagrams similar to FIG. 3, but with a shortened control in comparison to FIG. 3.
Figure 6:
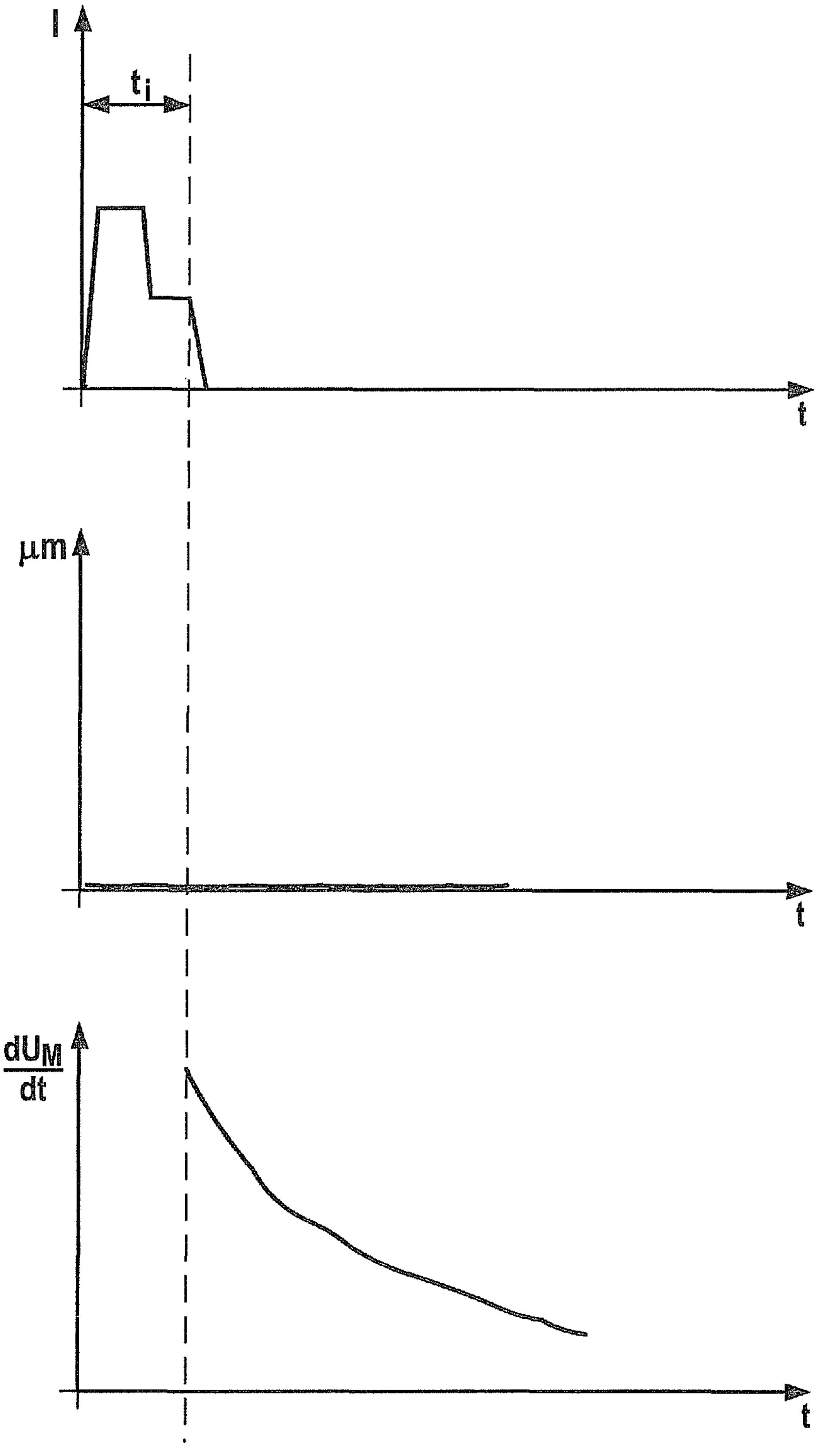
FIG. 6 shows three diagrams similar to FIG. 4, but with a control that has been shortened once again in comparison to FIG. 4.

FIG. 4 through 6 each show three scenarios for actuating injector 18 at control durations $t_i$ of different lengths of time. Each figure illustrates three diagrams. In each case, the upper diagram shows the time characteristic of control current 1; the middle diagram shows the characteristic curve of valve lift H; and the bottom diagram illustrates the characteristic curve of a first time derivative ("time gradient") of the coil voltage, showing decaying voltage $U_M$ across solenoid coil 26 upon completion of the control.

FIG. 4 shows a scenario as occurs in a normal operation, for example. Control current 1 and lift H of valve needle 28 correspond to the known sequence described above. It is apparent from the bottom diagram that the characteristic curve of the first derivative of voltage $U_M$ has a minimum 50 that identifies the instant when valve needle 28 makes contact in valve seat 32. Minimum 50 is conditional upon a change in the voltage curve of solenoid coil 26 that features a saddle-like curve at the instant valve needle 28 makes contact. This follows from the change in movement that occurs upon valve needle 28 making contact and from the change in the mutual inductance in solenoid coil 26 associated therewith.

FIG. 5 shows a scenario where a control duration $t_i$ is slightly shortened. The maximum displacement of valve needle 28 is no longer reached due to the brevity of control duration $t_i$. As a result, valve opening time $T_{op}$ is also shortened. The characteristic curve of the first derivative of voltage $U_M$ again features minimum 50 in response to valve needle 26 touching down in valve seat 32.

In FIG. 6, control duration $t_i$ is shortened further and, in fact, to such an extent that valve needle 26 is no longer able to lift off from valve seat 32. As a result, the characteristic curve of the first derivative of voltage $U_M$ does not have any minimum. Valve opening time $T_{op}$ and closing time $t_{ab}$ are not present, thus, considered mathematically=0.

If the two zero values are substituted into the above mentioned formula for defining valve opening duration $T_{op}$, then, for the case that control duration $t_i$ is so short that valve needle 28 has only just no longer lifted off, the result after transposing the formula is:

Control duration $t_i$=opening delay time $t_{11}$

This means that the principle of successive shortening of the control duration may be applied to ascertain opening delay time $t_{11}$. A precise knowledge of opening delay time $t_{11}$ makes it possible to refine the control and regulation of injectors 18*a* through 18*d* and, as a result, the entire fuel-injection process.

Figure 7:
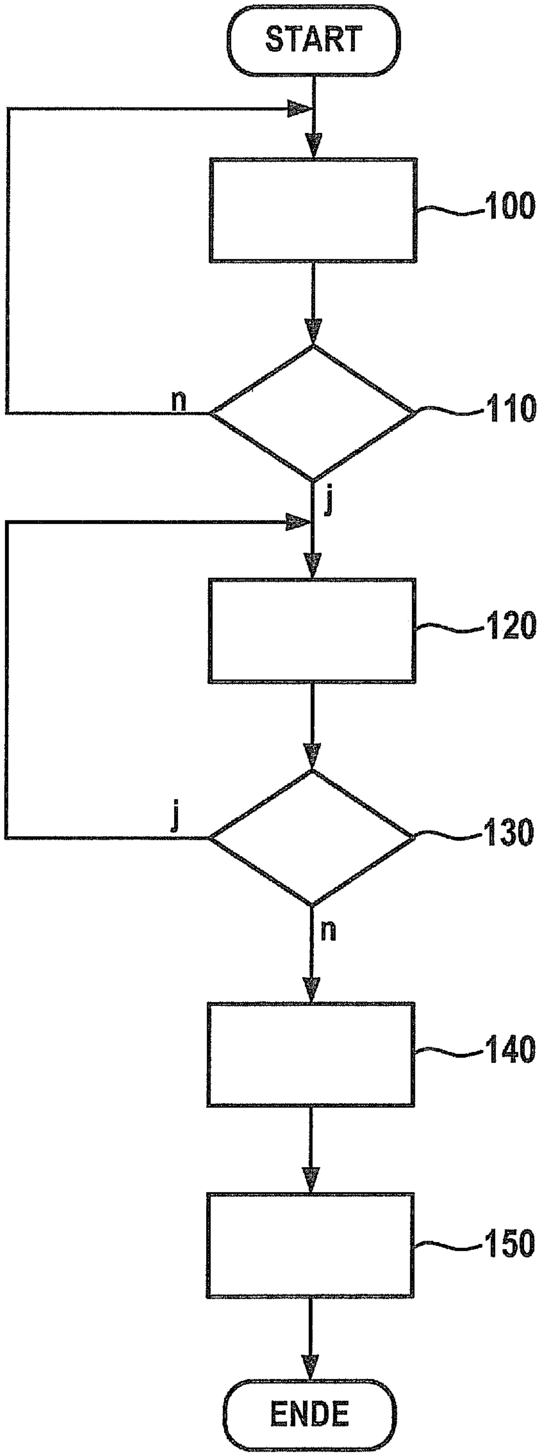
FIG. 7 shows a flow chart of a method for operating the internal combustion engine from FIG. 1.

One possible method for determining opening delay time $t_{11}$ is shown in FIG. 7:

The point of departure is a normal vehicle operation featuring control duration $t_i$ (reference numeral 100) predefined by control and regulating device 22. Subsequently thereto, control and regulating device 22 checks in step 110 whether the external conditions of internal combustion engine 10 permit a shortening of control duration $t_i$ for at least one injector 18, without the vehicle operation of internal combustion engine 10 being adversely affected. This would be the case during an overrun condition, for example. If this is possible, control duration $t_i$ is shortened for selected injector 18 in step 120. At the same time, the first derivative of voltage curve $U_M$ is calculated for assigned solenoid coil 26. If a minimum 50 is recognized in the characteristic curve of the first derivative (reference numeral 130), control duration $t_i$ is reduced further (branch to step 120). If a minimum is no longer recognized, critical control duration $t_1$ is reached. In this case, opening delay time $t_{11}$ is calculated in step 140 from the difference between the start and the end of control. Correction factors may possibly be included in the calculation as well. In step 150, measured injector 18 is characterized in the control and regulating device, making it possible to select another injector 18 for the next measuring cycle.

What is claimed is:

1. A method for operating an internal combustion engine in which fuel arrives in at least one combustion chamber of the engine via at least one injector configured as an electromagnetic actuating device, the method comprising:

analyzing, for different control durations of the injector, an electrical operating variable of the injector characterizing a closing of a valve element of the injector;

determining the shortest control duration of the injector in which a closing of the valve element can be detected; and determining the opening delay time of the injector based on the determined shortest control duration of the injector.

2. The method as recited in claim 1, wherein the opening delay time corresponds to the determined shortest control duration of the injector.

3. The method as recited in claim 1, wherein:

the shortest control duration of the injector in which a closing of the valve element can be detected is determined by one of: (i) successively reducing the length of control duration until a closing of the injector is no longer detectable; or (ii) successively increasing the control duration until a closing of the injector is detectable; and the opening delay time for the injector is determined from one of: (i) in the case of successively reducing the length of control duration, the time from the start of control until the last detectable closing of the injector; or (ii) in the case of successively increasing the control duration, the time from the start of control until the first detectable closing of the injector.

4. The method as recited in claim 1, wherein the electrical operating variable is a time gradient of a voltage of a coil of the electromagnetic actuating device, and wherein the closing of the valve element of the injector is determined from a minimum of the gradient.

5. The method as recited in claim 1, wherein the method is carried out repeatedly during the operation of the internal combustion engine.

6. The method as recited in claim 5, wherein the method is implemented during an operation of the internal combustion engine employing multipoint injections, and wherein the control duration is varied for one single point injection and compensated in at least one of a torque-neutral and exhaust gas-neutral manner by a variation in the control duration of at least one other single point injection.

7. The method as recited in claim 5, wherein the method is carried out during an overrun condition of the internal combustion engine under retarded ignition timing conditions.

8. The method as recited in claim 3, wherein the opening delay time corresponds to one of: (i) in the case of successively reducing the length of control duration, the control duration in which the movement of the valve element is last detected; or (ii) in the case of successively increasing the control duration, the control duration in which the movement of the valve element is first detected.

9. The method as recited in claim 8, wherein the ascertained opening delay time is considered in the control of the injector.

10. The method as recited in claim 8, wherein the opening delay is ascertained for all injectors in the case of an internal combustion engine having a plurality of injectors.

11. The method as recited in claim 8, wherein the method is implemented for different fuel pressures, and a characteristic map is generated from the results of the method.

12. A non-transitory computer-readable data storage medium storing a computer program having program codes which, when executed on a computer, performs a method for operating an internal combustion engine in which fuel arrives in at least one combustion chamber of the engine via at least one injector configured as an electromagnetic actuating device, the method comprising:

analyzing, for different control durations of the injector, an electrical operating variable of the injector characterizing a closing of a valve element of the injector;

determining the shortest control duration of the injector in which a closing of the valve element can be detected; and determining the opening delay time of the injector based on the determined shortest control duration of the injector.

13. A control system for operating an internal combustion engine in which fuel arrives in at least one combustion chamber of the engine via at least one injector configured as an electromagnetic actuating device, the control system comprising:

means for analyzing, for different control durations of the injector, an electrical operating variable of the injector characterizing a closing of a valve element of the injector;

means for determining the shortest control duration of the injector in which a closing of the valve element can be detected; and means for determining the opening delay time of the injector based on the determined shortest control duration of the injector.

14. The method as recited in claim 1, wherein the analyzing includes determining, based on the electrical operating variable, a time at which the valve element closes.

15. The method as recited in claim 14, wherein the analyzing further includes determining an amount of time that lapses from (a) a start of a control to close the valve element and (b) the time at which the valve element is determined to have closed.

16. The method as recited in claim 1, wherein the opening delay time is a period of time beginning when a control current is first applied for opening the valve element until when the valve element begins to open due to the application of the control current.

* * * * *